(12) United States Patent
Jolley et al.

(10) Patent No.: US 8,181,112 B2
(45) Date of Patent: May 15, 2012

(54) INDEPENDENT PORTLET RENDERING

(75) Inventors: Christopher Jolley, Lone Tree, CO (US); Subrahmanyam Allamaraju, San Ramon, CA (US); Timmothy Pesce, Arvada, CO (US)

(73) Assignee: Oracle International Corporation, Redwood Shores, CA (US)

( * ) Notice: Subject to any disclaimer, the term of this patent is extended or adjusted under 35 U.S.C. 154(b) by 975 days.

(21) Appl. No.: 11/131,620

(22) Filed: May 18, 2005

(65) Prior Publication Data

US 2006/0005137 A1    Jan. 5, 2006

Related U.S. Application Data

(60) Provisional application No. 60/573,204, filed on May 21, 2004.

(51) Int. Cl.
*G06F 3/00* (2006.01)

(52) U.S. Cl. ........ 715/742; 715/739; 715/743; 715/744; 715/745; 715/746; 715/760; 715/797

(58) Field of Classification Search .................. 715/742, 715/203, 204, 760, 739, 743, 744, 745, 746, 715/797
See application file for complete search history.

(56) References Cited

U.S. PATENT DOCUMENTS

| | | | | |
|---|---|---|---|---|
| 5,572,643 A * | 11/1996 | Judson | ........................... | 709/218 |
| 6,157,933 A * | 12/2000 | Celi et al. | ...................... | 715/234 |
| 6,385,336 B1 * | 5/2002 | Jin | ............................... | 382/162 |
| 6,738,804 B1 * | 5/2004 | Lo | .................................. | 709/219 |
| 6,766,369 B1 * | 7/2004 | Haitsuka et al. | ............... | 709/224 |
| 7,099,331 B2 * | 8/2006 | Taylor | ....................... | 370/395.41 |
| 7,146,429 B2 * | 12/2006 | Michel | .......................... | 709/238 |
| 7,155,493 B1 * | 12/2006 | Weber | .......................... | 709/218 |
| 7,222,101 B2 * | 5/2007 | Bishop et al. | ................... | 705/51 |
| 7,269,664 B2 * | 9/2007 | Hutsch et al. | ................. | 709/246 |
| 7,313,601 B2 * | 12/2007 | Fischer et al. | ................. | 709/217 |
| 7,346,843 B2 * | 3/2008 | Hind et al. | ..................... | 715/234 |
| 7,367,014 B2 * | 4/2008 | Griffin | ......................... | 717/107 |
| 7,376,900 B2 * | 5/2008 | Guido et al. | .................. | 715/742 |
| 7,475,089 B1 * | 1/2009 | Geddes | ............................... | 1/1 |
| 7,487,443 B2 * | 2/2009 | Guido et al. | .................. | 715/246 |
| 7,500,181 B2 * | 3/2009 | Kim et al. | ..................... | 715/234 |
| 7,996,757 B2 * | 8/2011 | Hind et al. | ..................... | 715/205 |
| 2001/0009016 A1 * | 7/2001 | Hofmann et al. | ............. | 709/219 |
| 2001/0034771 A1 * | 10/2001 | Hutsch et al. | ................. | 709/217 |
| 2002/0052928 A1 * | 5/2002 | Stern et al. | ..................... | 709/218 |
| 2002/0089549 A1 * | 7/2002 | Munro et al. | ................. | 345/835 |

(Continued)

OTHER PUBLICATIONS

Ask   Search,http://www.ask.com/web?qsrc=1&o=0&l=dir&q=independent+or+autonomous+portlet&o . . . .*

(Continued)

*Primary Examiner* — Boris Pesin
*Assistant Examiner* — John Heffington
(74) *Attorney, Agent, or Firm* — Fliesler Meyer LLP

(57) ABSTRACT

The rendering of portal pages on can be sped up by allowing individual portlets to be displayed while other portlets of the page are still waiting to finish rendering. Temporary messages can be displayed for the portlets that are still rendering. This temporary content can be replaced by the finished portal rendering for the slow rendering portlets. Additionally, a timeout feature for the portlets can be used. The timeout feature allows the rendering of the portlet to be stopped after a certain period of time.

20 Claims, 5 Drawing Sheets

U.S. PATENT DOCUMENTS

| | | | |
|---|---|---|---|
| 2002/0129241 A1* | 9/2002 | Doyle et al. | 713/157 |
| 2003/0050834 A1* | 3/2003 | Caplan | 705/14 |
| 2003/0110448 A1* | 6/2003 | Haut et al. | 715/513 |
| 2003/0149697 A1* | 8/2003 | Pasquali | 707/10 |
| 2003/0167315 A1* | 9/2003 | Chowdhry et al. | 709/218 |
| 2003/0187956 A1* | 10/2003 | Belt et al. | 709/219 |
| 2003/0188163 A1* | 10/2003 | Fischer et al. | 713/170 |
| 2004/0030741 A1* | 2/2004 | Wolton et al. | 709/202 |
| 2004/0078218 A1* | 4/2004 | Badinelli | 705/2 |
| 2004/0098467 A1* | 5/2004 | Dewey et al. | 709/219 |
| 2004/0122971 A1* | 6/2004 | Joshi et al. | 709/236 |
| 2004/0205555 A1* | 10/2004 | Hind et al. | 715/513 |
| 2004/0230901 A1* | 11/2004 | Godwin et al. | 715/513 |
| 2004/0243928 A1* | 12/2004 | Hesmer et al. | 715/505 |
| 2005/0021694 A1* | 1/2005 | Yuan | 709/220 |
| 2005/0021765 A1* | 1/2005 | Flores et al. | 709/228 |
| 2005/0065913 A1* | 3/2005 | Lillie et al. | 707/3 |
| 2005/0138104 A1* | 6/2005 | Houh et al. | 709/200 |
| 2005/0261909 A1* | 11/2005 | Sienel et al. | 704/270.1 |
| 2006/0031377 A1* | 2/2006 | Ng et al. | 709/208 |
| 2006/0053376 A1* | 3/2006 | Ng et al. | 715/742 |
| 2006/0070002 A1* | 3/2006 | Guido et al. | 715/733 |
| 2006/0089990 A1* | 4/2006 | Ng et al. | 709/227 |
| 2006/0149746 A1* | 7/2006 | Bansod et al. | 707/10 |
| 2006/0167981 A1* | 7/2006 | Bansod et al. | 709/203 |
| 2006/0235935 A1* | 10/2006 | Ng | 709/208 |
| 2007/0005731 A1* | 1/2007 | Lection et al. | 709/219 |
| 2008/0052617 A1* | 2/2008 | Guido et al. | 715/246 |
| 2008/0134014 A1* | 6/2008 | Hind et al. | 715/205 |

OTHER PUBLICATIONS

Ask Search, http://www.ask.com/web?qsrc=1&o=0&l=dir&q=%28independent+or+autonomous%29+r . . . .*
Ask Search, http://www.ask.com/web?q=%28independent+or+autonomous%29+render+portlet&qsrc=. . . .*
Ask Search,http://www.ask.com/web?qsrc=1&o=0&l=dir&q=autonomous+portlet.*
Ask Search, http://www.ask.com/web?qsrc=1&o=0&l=dir&q=2004+asynchronous+portlet+render&oo . . . .*
Ask Search, http://www.ask.com/web?q=asynchronous+portlet+render&qsrc=0&o=0&l=dir&oo=0.*
Novel, Asynchronous Portlet Processing, 2004.*
Ask Search, http://www.ask.com/web?qsrc=1&o=0&l=dir&q=independent+portlet&oo=0.*
Oracle, OTN Discussion Forum, Portlets and Remote Scripting, Apr. 7, 2004.*

* cited by examiner

_US 8,181,112 B2_

INDEPENDENT PORTLET RENDERING

CLAIM OF PRIORITY

This application claims priority to U.S. Provisional Application No. 60/573,204 entitled "Independent Portlet Rendering" filed May 21, 2004.

FIELD OF THE INVENTION

The present invention is directed to portal technology.

BACKGROUND

Portals can provide access to information networks and/or sets of services through the World Wide Web and other computer networks. Portals can provide a single point of access to data and applications, making them valuable to developers, businesses, and consumers alike. A portal can present a unified and personalized view of enterprise information to employees, customers, and business partners. In many implementations, portal applications can include web application views designed as a portal.

Portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

A working portal can be defined by a portal configuration. The portal configuration can include a portal definition such as a file including Extensible Markup Language (XML); portlet definition files for any portlets associated with the portal; java server pages (JSPs); web application descriptors; images such as graphics interchange format files (GIFs); deployment descriptors, configuration files, the java archive (JAR) files that contain the logic and formatting instructions for the portal application; and any other files necessary for the desired portal application.

DETAILED DESCRIPTION

Portals can provide access to information networks and/or sets of services through the World Wide Web (WWW) or other computer networks. These networks can range from broad interconnections of computing systems such as the Internet to localized area networks including a few computers located in close geographic proximity such as a home or office. Portal applications can include web application views designed as a portal.

Portlets can be implemented as java server pages (JSPs) referenced by XML-based metadata of the portal descriptor. Portlets can utilize various types of display code to display highly focused information directed to a specific user or user group, having a portal as its container. Portlets can be comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections). In one embodiment, a portlet is defined by a file that contains a portlet's XML-based metadata, which is created and edited by an integrated design environment or administration tool. Portlets can also be associated with portlet resource files including skeleton JSPs (one for each portlet layout element) and image files saved to a local file system by portal designer of integrated design environment.

In one embodiment, the portlets can be rendered in their own threads. A "forkable" portlet is one whose execution takes place on the thread that is separate from the main servlet thread (This thread can allocated from a separate thread pool and can be configured in the config.xml file). This can increase the efficiency as the total time to execute the page is no longer the sum of all portlet execution times but is now limiting by the longest running portlet. However, all portlets on a portal page must finish execution before the page can be rendered as a single Hypertext Markup Language (HTML) document. Therefore, the slowest portlet, and more generally the slowest-executing portion of a portal page still act as the governing entity with regard to actual portal response time. That is to say, the "longest link" in the processing chain can still have a significant effect on portal response time.

The present invention concerns ways to speed up the presentation of a portal page to a user. One embodiment of the present invention concerns providing a portal page display with only the fast rendering portlets at first and then later providing the slow rendering portlet information to update the display. This can enhance the user experience since the display does not wait for slow rendering but potentially inessential portlets.

Another embodiment concerns the use of a timeout property for portlets. If the portlet rendering exceeds the timeout period, the rendering of the portlet can stop. An error message can be displayed to the user.

Figure 1C:
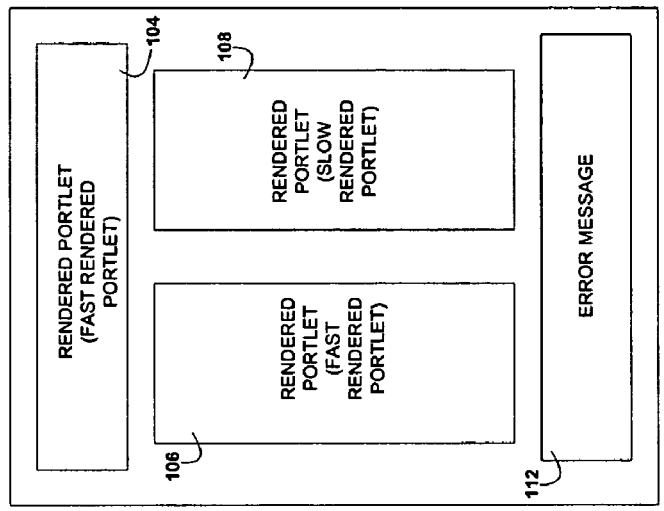
FIGS. 1A-1C are diagrams that illustrate the display of a portal page of one embodiment of the present invention.
Figure 1B:
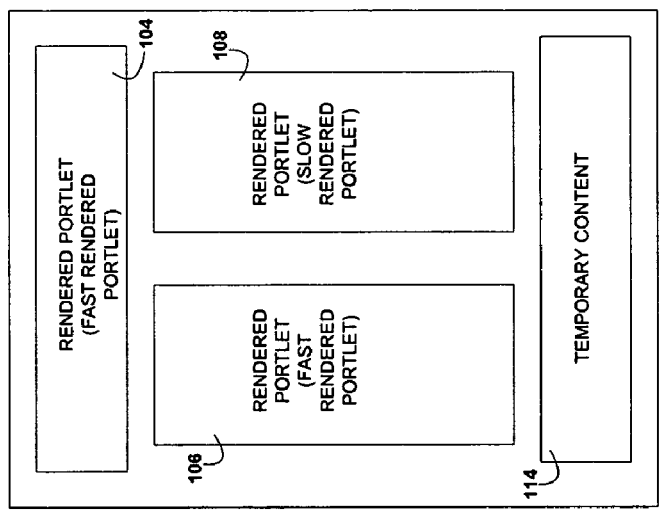
Figure 1A:
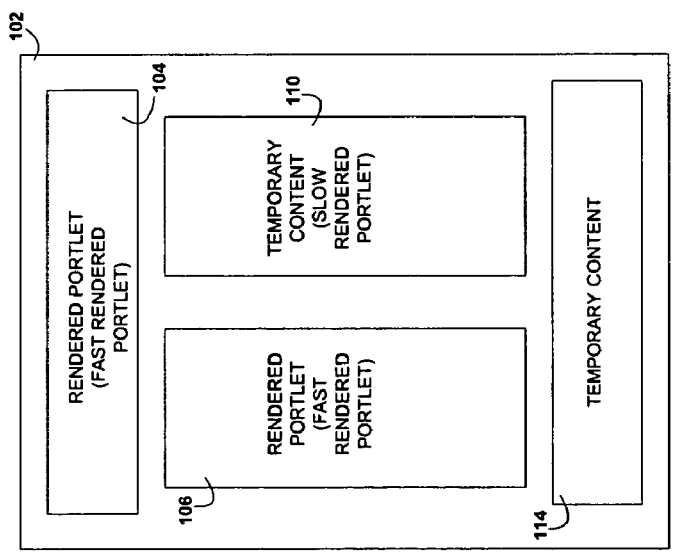

FIGS. 1A-1C are diagrams that illustrate one embodiment of the present invention. In one embodiment, a portal page is constructed using portlets. As shown in FIG. 1A, the display 102 of the portal page does not wait for at least one slow rendering portlet but at least one fast rendering portlet 104 is displayed to the user before the at least one slow rendering portlet. As shown in FIG. 1B, the display can be updated with the at least one slow rendering portlet 108 after it renders.

Looking again at FIG. 1A, temporary content 110 can be displayed for a slow rendering portlet. A fast content (temporary content) Uniform Resource Indicator (URI) can be used to obtain the temporary content 110 if the portlet is slow to render. The portlets can have a 'fast content URI' property to indicate the URI of the temporary content. 'Fast content URI' is an optional URI that the system can render if the portlet is in 'render independently' mode. The fast content could display a simple message like "retrieving flight information." while the system is working on the real portlet content, and upon completion would replace the 'fast content' in the portal.

The independent rendering functions of the portlets can be activated or inactivated based on stored information for each portlet. This allows essential portlets to always be rendered with the first display of the portal page.

A 'supports rendering independently' property of the portlet marks the portlet as supporting this feature. This property can be set in the IDE as it is determined by the developer. The developer can decide if the portlet will not be adversely affected if the portlets rendering phase is out of sync with other portlets. A case where a portlet's functionality could be affected is were the developer inserts request or session attributes during the render phase and other portlets are relying on these attributes.

'A render independently' property of the portlet can actually turn on the independent rendering function for the portlet. The portal framework would not wait for the portlet to finish rendering before sending its HTML to the browser. When the portlet completes the rendering phase, the portlet's contents can get injected into the main page.

In one embodiment, the portlet execution can be timed out if the portlet rendering exceeds a predetermined period of time. FIG. 1C shows an error message 112 that is displayed to the user after a portlet times out. In this case, an error message 112 can replace the temporary content 114. A 'timeout' attribute of the portlet can inform the framework to kill the processing of the portlet if the execution of the portlet exceeds that of the timeout value. This can insure that one portlet cannot bring down the entire portal. Upon a portlet timeout, an error message can be displayed in the portlet's content indicating a timeout has occurred and the user may wish to try again.

The server 202 can be used to produce the portal for display at the browser client 204. In one embodiment, the server 202 produces portal display information in response to a request from the browser client 204. The portal can be configured for different users and different group of users, where different portlets can be displayed based upon a user's group or role. The server 202 can use a portlet configuration 210. The portlet configurations including a portal definition 212 which can be an XML file pointing to portal elements 214. In one embodiment, the portal elements can include a portlet definition 216. The properties of the portlet can include the "support rendering independently", "fast content URI" and "timeout". These properties can be stored in the portlet definition. The portal elements 214 can also include other portals elements 218, such as images, look and feel elements JSPs and the like. The server 202 can use the properties stored in the portlet definition to determine the information provided to the browser client 204. The server 202 can be software that can be run on one or more server machines. In one embodiment, the server 202 is the WebLogic Server™ available BEA Systems Inc., of San Jose, Calif.

The browser client 204 can produce a display 220 of the portal pages and other information from the Internet. In one embodiment, the Document Object Model (DOM) standard is supported by the client as well as the current browser client supporting javascript. The DOM/javascript 224 can be used for updating the portal page displays with the information provided by the server as discussed below.

A portal product 230 can be Integrated Designed Environment (IDE) for producing the portal. In one embodiment, the IDE includes a portal designer 232 for the design of the portal, portlets and other portal elements. The administration tools 234 and visitor tools 236 are used for producing versions of the portal. In one embodiment, different version use the portal configuration 210 and stores it in a database where changes to the portal configuration can be done. Portals can be produced from the database or directly from the portal configuration.

Figure 3:
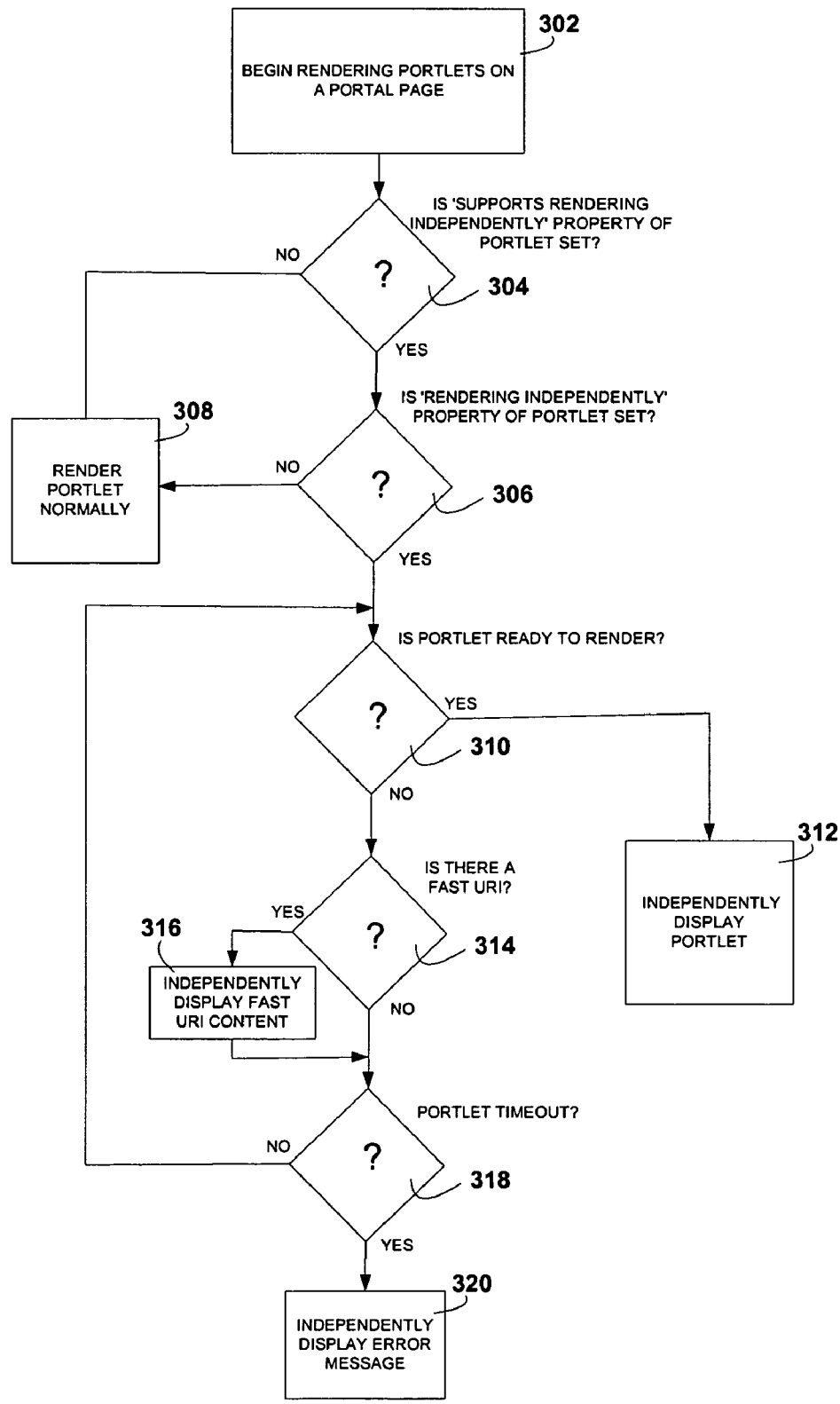
FIG. 3 is a flowchart of a method of the present invention.

FIG. 3 illustrates a flow chart of one embodiment in the present invention. In step 302, the rendering of the portlets or the portal page has begun. If the "support rendering independently" property is not set, as determined in step 304, or the "rendering independently property" is not set as determined in step 306, then, in step 308, the portlet is rendered without independent portlet rendering.

If a portet is ready to render in step 310, then the independent display of the portlet can be done in step 312. If not, if there is a fast URI as determined in step 314, independent display of the fast URI content can be can be done in step 316. If the portlet times out as determined in step 318, an independently displayed error message can be produced in step 320. Steps 304-320 can be done independently for each portlet, each portlet in its own thread.

Figure 4:
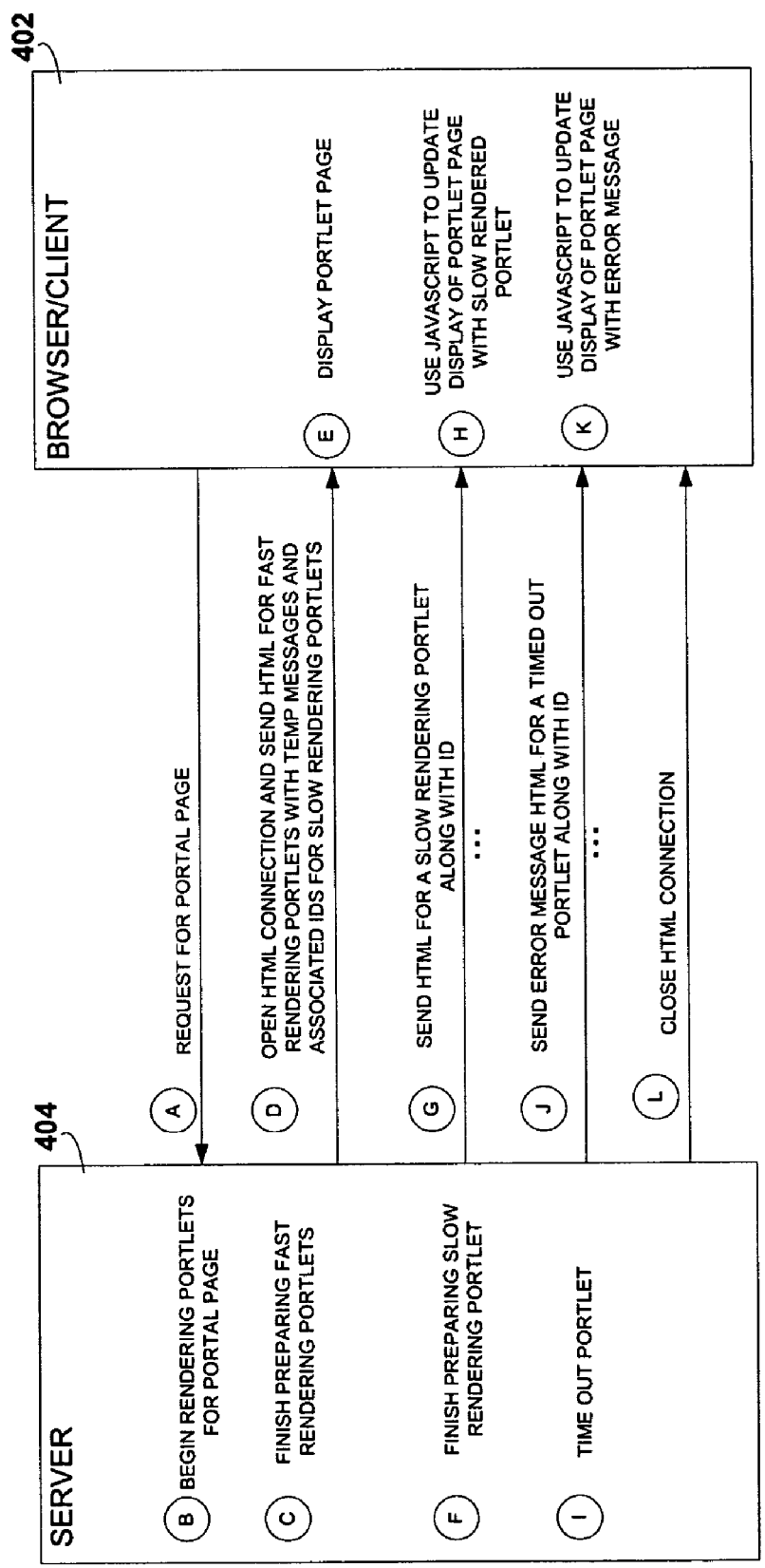
FIG. 4 illustrates interactions of a server and a browser client of one embodiment of the present invention.

FIG. 4 illustrates the operation of one embodiment of the present invention. The browser client 402 sends a request, in step A, for a portal page to the server 404. In step B, the server begins rendering the portlets for the portal page. In step C, the preparation of the fast rendering portlets is finished. In one embodiment, the fast rendering portlets are determined after certain period of time or after certain number of portlets are finished. In step D, an HTML connection with the browser client is opened. HTML for the fast running portlets is set along with temporary messages for and associated IDs for the slow rendering portlets to the browser/client 402. In step E, browser client 402 can display the portlet page. This can correspond to the display of FIG. 1A. In step F, the preparing of a slow rendering portlet is finished and an HTML for a slow rendering portlet along with the ID of the portlet is set to the browser/client 402, in step G. In step H, javascript can be used to update the display of the portal rendering page with the slow rendering portlet. This can correspond with the display of FIG. 1B.

In step I, a portlet times out. In step J an error message can be sent for a timed out portlet along with the portlet ID. In step K, the browser/client 402 use javascript to update the display of the portlet page with error message. This can correspond with the display of FIG. 1C. In step L, the HTML connection can be closed.

Delayed rendering can use ordinary HTTP request response type mechanisms to achieve its goal. A portlet that is delayed will not output its content into the HPPT response but instead can output a div tag with a special id/name. This marks a place in the DOM were javascript at the browser can update the contents at a later time. The HPPT response is held open unitl the delayed portlets are finished or timeout. This gives the illusion that the portlet's content is being pushed to the browser.

The response is not held open any longer than if we did not do delayed rendering. In one embodiment, the benefit comes with the HTML filing the screen a lot faster with portlest that have already finished their execution.

In one embodiment, a timeout property of a portlet is checked. If the timeout property value is exceeded by the rendering time of the portlet, the rendering of the portlet is ended. This can be done as part of the delayed rendering system of FIG. 3 as discussed above.

Figure 5:
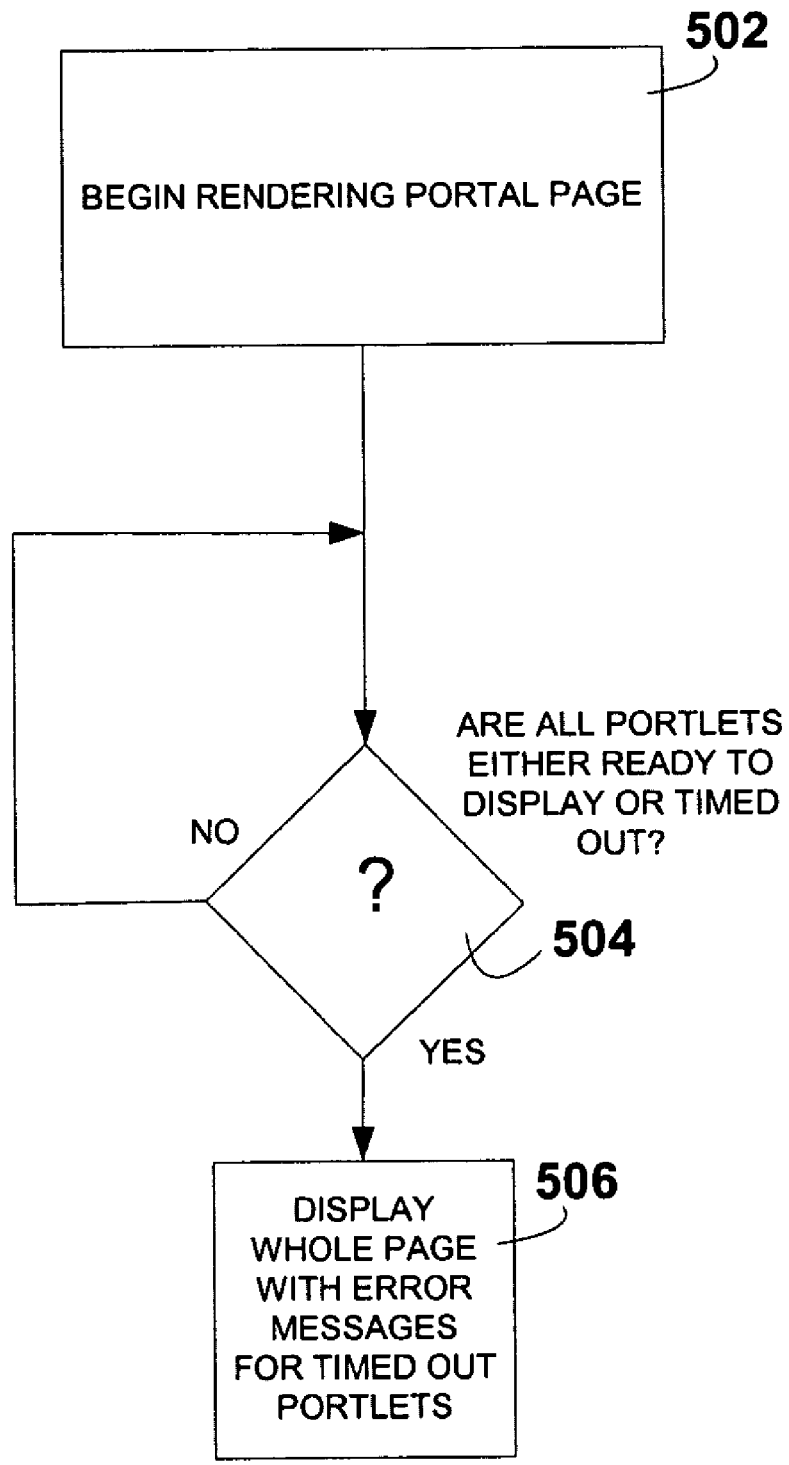
FIG. 5 is a flowchart of a method of the present invention.

FIG. 5 shows an alternate embodiment where the display waits until all portlets render or the timeout property value is exceeded for all portlets. In step 502, rendering begins. After step 504 determines that all of the portlets are either ready to displayed or timeout, the display of the whole page with any error messages for timed out potlets is done in step 506.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nan systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A computer system for implementing a portal page constructed using portlets, comprising:
    a computer including a computer readable medium and processor operating thereon;
    a server, executing on the computer, operable to present a portal in response to a request from a client;
    a plurality of portlets at the server, wherein each portlet is associated with a plurality of properties, and wherein each portlet is rendered in a separate thread;
    a plurality of portal configurations that each define which of the plurality of portlets are included in the portal page and include static content and layout elements which define a layout of the portal page;
    wherein the server, upon receiving a request from the client to render the portal page, performs the steps of
        providing a connection to the client,
        determining, for each of the portlets, whether that particular portlet can be rendered independently of other portlets in the portal page, based on a render property associated with that particular portlet, wherein the render property indicates whether that particular portlet can be rendered asynchronously without affecting functionality of that particular portlet or the other portlets in the portal page,
    for each portlet that cannot be rendered independently, providing render information to render those portlets, and
    for each portlet that can be rendered independently,
        if the portlet is ready to be rendered, providing render information to the client to render that portlet, and
        if the portlet is not ready to be rendered,
            determining whether the portlet includes an associated property that indicates a location of temporary content which can be rendered temporarily, until that portlet is ready to be rendered,
        providing information to the client to render the temporary content for the portlet, and
        subsequently, when the portlet is ready to be rendered, providing information to render the portlet to the client which uses scripts in the portal page to replace the temporary content.

2. The computer system of claim 1, wherein portlets have a 'fast content URI' property to indicate a URI of content that can temporarily be displayed if the portlet is slow to render.

3. A method of displaying a portal page constructed using portlets, the method including:
    providing a computer including a computer readable medium and processor operating thereon;
    providing a server, executing on the computer, operable to present a portal page in response to a request from a client, wherein the server includes
        a plurality of portlets at the server, wherein each portlet is associated with a plurality of properties, and wherein each portlet is rendered in a separate thread;
        a plurality of portal configurations that each define which of the plurality of portlets are included in the portal page and include static content and layout elements which define a layout of the portal page;
    receiving, by the server, a request from the client to render the portal page;
    providing, by the server, a connection to the client;
    determining, by the server, for each of the portlets, whether that particular portlet can be rendered independently of other portlets in the portal page, based on a render property associated with that particular portlet, wherein the render property indicates whether that particular portlet can be rendered asynchronously without affecting functionality of that particular portlet or the other portlets in the portal page;
    for each portlet that cannot be rendered independently, providing, by the server, information to render those portlets; and
    for each portlet that can be rendered independently,
        if the portlet is ready to be rendered, providing information to the client to render those portlets,
        if the portlet is not ready to be rendered,
            determining whether the portlet includes an associated property that indicates a location of temporary content which can be rendered temporarily, until that portlet is ready to be rendered,
            providing information to the client to render the temporary content for the portlet, and
            subsequently, when the portlet is ready to be rendered, providing information to render the portlet to the client which uses scripts in the portal page to replace the temporary content.

4. The method of claim 3, wherein the display of a portal page does not wait for at least one slow rendering portlet but at least one fast rendering portlet is displayed to the user before the at least one slow rendering portlet.

5. The method of claim 3, wherein portlets have a 'fast content URI' property to indicate a URI of content that can temporarily be displayed if the portlet is slow to render.

6. The computer system of claim 1, wherein the server further performs the steps of:

for each portlet that can be rendered independently, if the portlet is not ready to be rendered
   checking a timeout property of the portlet; and
   if the timeout property value is exceeded by a rendering time of the portlet, ending the rendering of the portlet.

7. The computer system of claim 6, wherein an error message is displayed when the portlet times out.

8. The method of claim 3, further comprising:
for each portlet that can be rendered independently, if the portlet is not ready to be rendered
   checking, by the server, a timeout property of the portlet; and
   if the timeout property value is exceeded by a rendering time of the portlet, ending the rendering of the portlet.

9. The method of claim 8, wherein an error message is displayed when the portlet times out.

10. A computer system for implementing a portal page constructed using portlets, comprising:
   a computer including a computer readable medium and processor operating thereon;
   a server executing on the computer, wherein the server is operable to receive requests from clients and provide a portal page in response;
   wherein the portal page includes a plurality of portlets and static content arranged according to a portal configuration, and wherein each portlet is associated with a plurality of properties including a render property which indicates whether that portlet can be rendered asynchronously with other portlets in the portal page without affecting functionality of that portlet; and
   wherein when a request is received at the server from a client, the server
      determines a set of portlets that can be rendered independently based on the render property,
      sends render information to the client for the portal page, the set of portlets, the static content, and temporary content for each portlet that cannot be rendered independently, and
      subsequently replaces the temporary content for each portlet when those portlets are ready to be rendered.

11. The computer system of claim 10, wherein the server further performs the steps of:
for each portlet that can be rendered independently, if the portlet is not ready to be rendered
   checking a timeout property of the portlet; and
   if the timeout property value is exceeded by a rendering time of the portlet, ending the rendering of the portlet.

12. The computer system of claim 10, wherein an error message is displayed when the portlet times out.

13. The computer system of claim 10, wherein at least one fast rendering portlet is displayed to the user before the at least one slow rendering portlet.

14. The computer system of claim 10, wherein portlets have a 'fast content URI' property to indicate a URI of content that can temporarily be displayed if the portlet is slow to render.

15. The computer system of claim 1, wherein the render property is set by a developer using an integrated development environment (IDE).

16. The computer system of claim 1, wherein the render property comprises:
   a supports rendering independently property that indicates whether that portlet can be rendered independently; and
   a render independently property that instructs the server to render that portlet independently of other portlets in the portal page.

17. The method of claim 3, wherein the render property is set by a developer using an integrated development environment (IDE).

18. The method of claim 3, wherein the render property comprises:
   a supports rendering independently property that indicates whether that portlet can be rendered independently; and
   a render independently property that instructs the server to render that portlet independently of other portlets in the portal page.

19. The computer system of claim 10, wherein the render property is set by a developer using an integrated development environment (IDE).

20. The computer system of claim 10, wherein the render property comprises:
   a supports rendering independently property that indicates whether that portlet can be rendered independently; and
   a render independently property that instructs the server to render that portlet independently of other portlets in the portal page.

* * * * *

UNITED STATES PATENT AND TRADEMARK OFFICE
CERTIFICATE OF CORRECTION

| | | |
|---|---|---|
| PATENT NO. | : 8,181,112 B2 | Page 1 of 1 |
| APPLICATION NO. | : 11/131620 | |
| DATED | : May 15, 2012 | |
| INVENTOR(S) | : Jolley et al. | |

Figure 2:
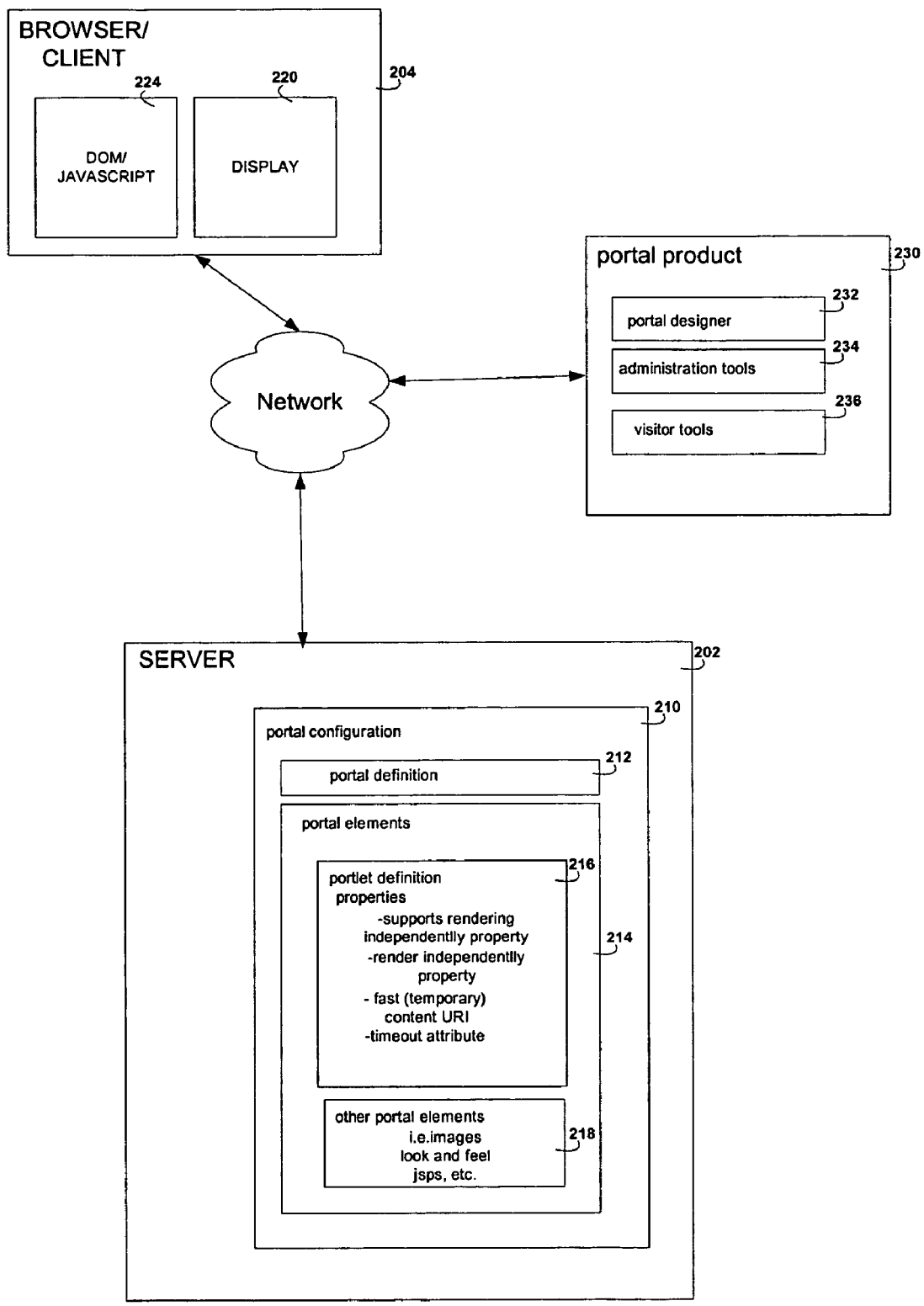
FIG. 2 illustrates a system of one embodiment of the present invention.

It is certified that error appears in the above-identified patent and that said Letters Patent is hereby corrected as shown below:

On sheet 2 of 5, in figure 2, Box. 216, line 4, delete "independentlly" and insert -- independently --, therefor.

On sheet 2 of 5, in figure 2, Box. 216, line 5, delete "independentlly" and insert -- independently --, therefor.

In column 3, line 2, delete "were" and insert -- where --, therefor.

In column 4, line 1, delete "portet" and insert -- portlet --, therefor.

In column 4, line 41, delete "unitl" and insert -- until --, therefor.

In column 4, line 46, delete "portlest" and insert -- portlets --, therefor.

In column 4, line 58, delete "potlets" and insert -- portlets --, therefor.

In column 5, line 45, in Claim 1, delete "portal" and insert -- portal page --, therefor.

Signed and Sealed this
Thirty-first Day of July, 2012

David J. Kappos
*Director of the United States Patent and Trademark Office*